(12) United States Patent
Taylor et al.

(10) Patent No.: US 7,639,623 B2
(45) Date of Patent: Dec. 29, 2009

(54) METHOD AND SYSTEM FOR REAL TIME SIMULTANEOUS MONITORING OF LOGICAL CIRCUITS IN A DATA NETWORK

(75) Inventors: William Taylor, Duluth, GA (US); David Massengill, Covington, GA (US); John Hollingsworth, Covington, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 646 days.

(21) Appl. No.: 10/744,283

(22) Filed: Dec. 23, 2003

(65) Prior Publication Data

US 2005/0135263 A1  Jun. 23, 2005

(51) Int. Cl.
*H04L 12/26* (2006.01)

(52) U.S. Cl. .................. 370/244; 370/242; 370/250; 370/216; 370/217; 370/218; 370/219; 370/221; 370/389; 370/395.1; 714/4; 714/43

(58) Field of Classification Search ............ 370/244, 370/242, 250, 216–219, 221, 389, 395.1; 714/4, 43
See application file for complete search history.

(56) References Cited

U.S. PATENT DOCUMENTS

| | | | |
|---|---|---|---|
| 4,905,233 A | 2/1990 | Cain et al. ............... 370/237 |
| 5,016,244 A | 5/1991 | Massey et al. | |
| 5,065,392 A | 11/1991 | Sibbitt et al. | |
| 5,265,092 A | 11/1993 | Soloway et al. | |
| 5,375,126 A | 12/1994 | Wallace | |
| 5,408,461 A | 4/1995 | Uriu et al. | |
| 5,539,817 A | 7/1996 | Wilkes | |
| 5,544,170 A | 8/1996 | Kasahara | |
| 5,548,639 A | 8/1996 | Ogura et al. | |
| 5,559,959 A | 9/1996 | Foglar | |
| 5,629,938 A | 5/1997 | Cerciello et al. | |
| 5,633,859 A | 5/1997 | Jain et al. | |
| 5,650,994 A | 7/1997 | Daley | |
| 5,832,197 A | 11/1998 | Houji | |
| 5,856,981 A | 1/1999 | Voelker | |
| 5,894,475 A | 4/1999 | Bruno et al. | |
| 5,926,456 A | 7/1999 | Takano et al. ............... 370/218 |

(Continued)

OTHER PUBLICATIONS

Chen, Thomas M. and Liu, Steve S., Management and Control Functions in ATM Switching Systems, IEEE Network, Jul./Aug. 1994.*

(Continued)

*Primary Examiner*—Ricky Ngo
*Assistant Examiner*—Luat Phung
(74) *Attorney, Agent, or Firm*—Hanley, Flight and Zimmerman, LLC (57) ABSTRACT

For real time simultaneous monitoring of logical circuits in a data network, a network management module receives trap data for a group of logical circuits in the data network. The trap data may include current status information for each of the circuits in the logical circuit group. Next, based on the trap data, a logical identifier associated with each of the logical circuits in the group is identified. Then, each of the logical identifiers is associated with customer data stored in a database. The customer data includes one or more logical identifiers associated with a customer identification. Finally, the current status information for the logical circuit group is displayed along with the corresponding customer identification.

22 Claims, 5 Drawing Sheets

U.S. PATENT DOCUMENTS

| | | | |
|---|---|---|---|
| 5,936,939 A | 8/1999 | Des Jardins et al. | |
| 6,028,863 A * | 2/2000 | Sasagawa et al. | 370/399 |
| 6,038,219 A | 3/2000 | Mawhinney et al. | 370/242 |
| 6,091,951 A | 7/2000 | Sturniolo et al. | |
| 6,104,998 A * | 8/2000 | Galand et al. | 704/500 |
| 6,108,300 A | 8/2000 | Coile et al. | |
| 6,108,307 A * | 8/2000 | McConnell et al. | 370/235 |
| 6,118,763 A | 9/2000 | Trumbull | |
| 6,147,998 A | 11/2000 | Kelley et al. | |
| 6,167,025 A * | 12/2000 | Hsing et al. | 370/216 |
| 6,181,675 B1 | 1/2001 | Miyamoto | 370/218 |
| 6,181,679 B1 * | 1/2001 | Ashton et al. | 370/244 |
| 6,185,695 B1 | 2/2001 | Murphy et al. | |
| 6,195,416 B1 * | 2/2001 | DeCaluwe et al. | 379/32.05 |
| 6,259,696 B1 | 7/2001 | Yazaki et al. | |
| 6,269,401 B1 | 7/2001 | Fletcher et al. | |
| 6,311,288 B1 | 10/2001 | Heeren et al. | |
| 6,360,260 B1 | 3/2002 | Compliment et al. | |
| 6,377,548 B1 | 4/2002 | Chuah | 370/233 |
| 6,421,722 B1 | 7/2002 | Bauer et al. | |
| 6,424,629 B1 | 7/2002 | Rubino et al. | |
| 6,449,259 B1 | 9/2002 | Allain et al. | |
| 6,456,306 B1 | 9/2002 | Chin et al. | 715/810 |
| 6,473,398 B1 * | 10/2002 | Wall et al. | 370/229 |
| 6,535,990 B1 | 3/2003 | Iterum et al. | |
| 6,538,987 B1 | 3/2003 | Cedrone et al. | |
| 6,553,015 B1 | 4/2003 | Sato | 370/331 |
| 6,556,659 B1 | 4/2003 | Bowman-Amuah | |
| 6,570,846 B1 | 5/2003 | Ryoo | |
| 6,581,166 B1 | 6/2003 | Hirst et al. | |
| 6,590,899 B1 | 7/2003 | Thomas et al. | |
| 6,594,246 B1 | 7/2003 | Jorgensen | |
| 6,594,268 B1 | 7/2003 | Aukia et al. | 370/400 |
| 6,597,689 B1 | 7/2003 | Chiu et al. | |
| 6,608,831 B1 | 8/2003 | Beckstrom et al. | |
| 6,643,254 B1 | 11/2003 | Kajitani et al. | 370/217 |
| 6,697,329 B1 | 2/2004 | McAllister et al. | |
| 6,716,165 B1 | 4/2004 | Flanders et al. | |
| 6,738,459 B1 | 5/2004 | Johnstone et al. | |
| 6,763,476 B1 | 7/2004 | Dangi et al. | |
| 6,766,113 B1 | 7/2004 | Al-Salameh et al. | |
| 6,781,952 B2 | 8/2004 | Shirakawa | |
| 6,795,393 B1 | 9/2004 | Mazzurco et al. | |
| 6,795,394 B1 | 9/2004 | Swinkels et al. | |
| 6,810,043 B1 | 10/2004 | Naven et al. | |
| 6,823,477 B1 | 11/2004 | Cheng et al. | |
| 6,826,184 B1 | 11/2004 | Bryenton et al. | 370/395.1 |
| 6,829,223 B1 | 12/2004 | Richardson et al. | |
| 6,862,351 B2 | 3/2005 | Taylor | 379/221.06 |
| 6,865,170 B1 | 3/2005 | Zendle | |
| 6,882,652 B1 | 4/2005 | Scholtens et al. | |
| 6,925,578 B2 | 8/2005 | Lam et al. | |
| 6,952,395 B1 | 10/2005 | Manoharan et al. | |
| 6,973,034 B1 | 12/2005 | Natarjan et al. | |
| 6,973,037 B1 | 12/2005 | Kahveci | |
| 6,981,039 B2 | 12/2005 | Cerami et al. | |
| 6,983,401 B2 | 1/2006 | Taylor | 714/45 |
| 6,990,616 B1 | 1/2006 | Botton-Dascal et al. | |
| 7,027,053 B2 | 4/2006 | Berndt et al. | |
| 7,072,331 B2 | 7/2006 | Liu et al. | |
| 7,093,155 B2 | 8/2006 | Aoki | |
| 7,120,148 B1 | 10/2006 | Batz et al. | |
| 7,120,819 B1 | 10/2006 | Gurer et al. | 714/4 |
| 7,146,000 B2 | 12/2006 | Hollman et al. | |
| 7,165,192 B1 | 1/2007 | Cadieux et al. | 714/43 |
| 7,200,148 B1 | 4/2007 | Taylor et al. | 370/395.1 |
| 7,209,452 B2 | 4/2007 | Taylor et al. | 370/241 |
| 7,240,364 B1 * | 7/2007 | Branscomb et al. | 726/9 |
| 7,275,192 B2 | 9/2007 | Taylor et al. | |
| 7,287,083 B1 | 10/2007 | Nay et al. | |
| 7,350,099 B2 | 3/2008 | Taylor et al. | |
| 7,460,468 B2 | 12/2008 | Taylor et al. | |
| 7,466,646 B2 | 12/2008 | Taylor et al. | |
| 2001/0000700 A1 | 5/2001 | Eslambolchi et al. | 370/217 |
| 2002/0001307 A1 | 1/2002 | Nguyen et al. | |
| 2002/0072358 A1 | 6/2002 | Schneider et al. | |
| 2002/0089985 A1 | 7/2002 | Wahl et al. | 370/395 |
| 2002/0172148 A1 | 11/2002 | Kim et al. | |
| 2003/0043753 A1 | 3/2003 | Nelson et al. | |
| 2003/0051049 A1 | 3/2003 | Noy et al. | |
| 2003/0051195 A1 | 3/2003 | Bosa et al. | 714/43 |
| 2003/0086413 A1 | 5/2003 | Tartarelli et al. | |
| 2003/0091024 A1 | 5/2003 | Stumer | 370/352 |
| 2003/0128692 A1 | 7/2003 | Mitsumori et al. | |
| 2003/0152028 A1 | 8/2003 | Raisanen et al. | |
| 2003/0185151 A1 | 10/2003 | Kurosawa et al. | |
| 2004/0090973 A1 | 5/2004 | Christie et al. | 370/401 |
| 2004/0125776 A1 | 7/2004 | Haugli et al. | |
| 2004/0141464 A1 | 7/2004 | Taylor et al. | 370/241 |
| 2004/0172574 A1 | 9/2004 | Wing et al. | |
| 2005/0002339 A1 | 1/2005 | Patil et al. | |
| 2005/0013242 A1 | 1/2005 | Chen et al. | 370/228 |
| 2005/0135237 A1 | 6/2005 | Taylor et al. | |
| 2005/0135238 A1 | 6/2005 | Taylor et al. | |
| 2005/0135254 A1 | 6/2005 | Taylor et al. | |
| 2005/0135263 A1 | 6/2005 | Taylor et al. | 370/244 |
| 2005/0138203 A1 | 6/2005 | Taylor et al. | |
| 2005/0138476 A1 | 6/2005 | Taylor et al. | |
| 2005/0152028 A1 | 7/2005 | Mitzkus | |
| 2005/0172160 A1 | 8/2005 | Taylor et al. | |
| 2005/0172174 A1 | 8/2005 | Taylor et al. | |
| 2005/0237925 A1 | 10/2005 | Taylor et al. | 370/216 |
| 2005/0238006 A1 | 10/2005 | Taylor et al. | |
| 2005/0238007 A1 | 10/2005 | Taylor et al. | 370/389 |
| 2005/0238024 A1 | 10/2005 | Taylor et al. | |
| 2005/0240840 A1 | 10/2005 | Taylor et al. | 714/724 |
| 2006/0146700 A1 | 7/2006 | Taylor et al. | |
| 2007/0050492 A1 | 3/2007 | Jorgensen | |
| 2007/0168200 A1 | 7/2007 | Shimizu | |

OTHER PUBLICATIONS

Meserole, Thomas A. and Prasad, Anil, Customer Network Management (CNM) for ATM Public Network Service (M3 Specification), af-nm-0019.000, Rev. 1.04, Oct. 1994.*

Mangan, Tim, 0A&M: How a Frame Relay SLA is Measured and Diagnosed, http://www.mfaforum.org/frame/Whitepaper/whitepapers/OAMwhitepaper.shtml.*

Official Action dated Oct. 2, 2006, in U.S. Appl. No. 10/744,281 (16 pages).

Official Action dated Apr. 17, 2007, in U.S. Appl. No. 10/744,281.

Official Action dated Jul. 20, 2007, in U.S. Appl. No. 10/745,170.

Official Action dated Aug. 6, 2007, in U.S. Appl. No. 10/744,555.

Official Action dated Aug. 7, 2007, in U.S. Appl. No. 10/745,116.

Official Action dated Aug. 8, 2007, in U.S. Appl. No. 10/745,117.

Official Action dated Aug. 8, 2007, in U.S. Appl. No. 10/744,921.

Official Action dated Aug. 8, 2007, in U.S. Appl. No. 10/745,168.

U.S. Official Action dated Apr. 17, 2008 in U.S. Appl. No. 10/745,117.

U.S. Official Action dated Apr. 17, 2008 in U.S. Appl. No. 10/745,170.

Official Action dated Apr. 28, 2008, in U.S. Appl. No. 10/745,116.

Official Action dated May 1, 2008, in U.S. Appl. No. 10/744,921.

Official Action dated May 2, 2008, in U.S. Appl. No. 10/745,168.

Official Action dated May 12, 2008, in U.S. Appl. No. 10/745,117.

Official Action dated May 12, 2008, in U.S. Appl. No. 10/744,555.

Official Action dated Jun. 12, 2008, in U.S. Appl. No. 10/745,047.

Official Action dated May 15, 2006, in U.S. Appl. No. 10/829,509 (11 pages).

Official Action dated Nov. 13, 2006, in U.S. Appl. No. 10/829,509 (12 pages).

Official Action dated Jan. 4, 2007, in U.S. Appl. No. 10/348,077 (16 pages).

Official Action dated Aug. 10, 2007, in U.S. Appl. No. 10/348,077 (26 pages).
Official Action dated Sep. 7, 2007, in U.S. Appl. No. 10/829,495 (23 pages).
Official Action dated Sep. 10, 2007, in U.S. Appl. No. 10/829,795 (21 pages).
Official Action dated Sep. 19, 2007, in U.S. Appl. No. 10/829,584 (15 pages).
Official Action dated Oct. 17, 2007, in U.S. Appl. No. 10/829,539 (19 pages).
Official Action dated Apr. 30, 2008, in U.S. Appl. No. 10/829,795 (20 pages).
Official Action dated Jun. 11, 2008, in U.S. Appl. No. 10/829,495 (22 pages).
Official Action dated Jun. 25, 2008, in U.S. Appl. No. 10/829,584 (20 pages).
Official Action dated Aug. 20, 2008, in U.S. Appl. No. 10/829,539 (29 pages).
Official Action dated Oct. 29, 2008, in U.S. Appl. No. 10/829,495 (25 pages).
Official Action dated Oct. 31, 2008, in U.S. Appl. No. 10/744,921 (25 pages).
Official Action dated Nov. 14, 2008, in U.S. Appl. No. 10/745,170 (21 pages).
Official Action dated Nov. 25, 2008, in U.S. Appl. No. 10/829,539 (23 pages).
Official Action dated Nov. 26, 2008, in U.S. Appl. No. 10/745,117 (21 pages).
Official Action dated Dec. 2, 2008, in U.S. Appl. No. 10/745,168 (25 pages).
Official Action dated Jan. 14, 2009, in U.S. Appl. No. 10/744,555 (37 pages).
Don Ryan, The Telco Handbook For New Technicians—An Introduction To Telco Technology And Troubleshooting, Oct. 27, 2000, [retrieved from http://www.darkwing.netlaaron/telco.doc, accessed on Nov. 2, 2006], 67 pages.
United States Patent and Trademark Office, "Non-Final Office Action," issued in connection with U.S. Appl. No. 10/744,921, on Aug. 8, 2007 (16 pages).
United States Patent and Trademark Office, "Non-Final Office Action," issued in connection with U.S. Appl. No. 10/744,921, on Jul. 9, 2009 (24 pages).
United States Patent and Trademark Office, "Notice of Allowance," issued in connection with U.S. Appl. No. 10/745,047, on Jul. 23, 2009 (7 pages).
United States Patent and Trademark Office, "Notice of Allowance," issued in connection with U.S. Appl. No. 10/745,117, on May 14, 2009 (32 pages).
United States Patent and Trademark Office, "Advisory Action," issued in connection with U.S. Appl. No. 10/829,495, on Jun. 4, 2009 (3 pages).
United States Patent and Trademark Office, "Final Office Action," issued in connection with U.S. Appl. No. 10/829,495, filed Mar. 23, 2009 (33 pages).
United States Patent and Trademark Office, "Supplemental Notice of Allowance," issued in connection with U.S. Appl. No. 10/829,795, filed Nov. 13, 2008 (2 pages).
United States Patent and Trademark Office, "Notice of Allowance," issued in connection with U.S. Appl. No. 10/829,795, filed Sep. 9, 2008 (7 pages).
United States Patent and Trademark Office, "Final Office Action," issued in connection with U.S. Appl. No. 10/829,539, filed Mar. 13, 2009 (30 pages).
United States Patent and Trademark Office, "Advisory Action," issued in connection with U.S. Appl. No. 10/829,539, filed Jun. 12, 2009 (3 pages).
United States Patent and Trademark Office, "Notice of Allowance," issued in connection with U.S. Appl. No. 10/829,509, filed Jul. 10, 2007 (7 pages).
United States Patent and Trademark Office, "Notice of Allowance," issued in connection with U.S. Appl. No. 10/829,509, filed Feb. 1, 2007 (8 pages).
United States Patent and Trademark Office, "Notice of Allowance," issued in connection with U.S. Appl. No. 10/744,281, filed Oct. 30, 2007 (8 pages).
United States Patent and Trademark Office, "Notice of Allowance," issued in connection with U.S. Appl. No. 10/744,281, filed Aug. 27, 2007 (6 pages).
United States Patent and Trademark Office, "Interview Summary," issued in connection with U.S. Appl. No. 10/744,281, filed Aug. 6, 2007 (3 pages).
United States Patent and Trademark Office, "Interview Summary," issued in connection with U.S. Appl. No. 10/744,281, filed Nov. 27, 2006 (3 pages).
United States Patent and Trademark Office, "Final Office Action," issued in connection with U.S. Appl. No. 10/744,921, filed Apr. 6, 2009 (34 pages).
United States Patent and Trademark Office, "Final Office Action," issued in connection with U.S. Appl. No. 10/745,047, filed Mar. 27, 2009 (19 pages).
United States Patent and Trademark Office, "Notice of Allowance," issued in connection with U.S. Appl. No. 10/745,168, filed Jun. 12, 2009 (22 pages).
United States Patent and Trademark Office, "Notice of Allowance," issued in connection with U.S. Appl. No. 10/745,117, filed May 14, 2009 (32 pages).
United States Patent and Trademark Office, "Supplemental Notice of Allowance," issued in connection with U.S. Appl. No. 10/745,117, filed Jun. 15, 2009 (4 pages).
United States Patent and Trademark Office, "Office Communication—No Action Count," issued in connection with U.S. Appl. No. 10/829,584, filed Oct. 16, 2008 (4 pages).
United States Patent and Trademark Office, "Notice of Allowance," issued in connection with U.S. Appl. No. 10/829,584, filed Sep. 22, 2008 (7 pages).
United States Patent and Trademark Office, "Notice of Allowance," issued in connection with U.S. Appl. No. 10/745,116, filed May 7, 2009 (17 pages).
United States Patent and Trademark Office, "Notice of Allowance," issued in connection with U.S. Appl. No. 10/745,116, filed Dec. 3, 2008 (8 pages).
United States Patent and Trademark Office, "Final Office Action," issued in connection with U.S. Appl. No. 10/745,170, filed Apr. 28, 2009 (21 pages).
United States Patent and Trademark Office, "Advisory Action," issued in connection with U.S. Appl. No. 10/745,170, filed Oct. 21, 2008 (3 pages).
United States Patent and Trademark Office, "Notice of Allowance," issued in connection with U.S. Appl. No. 10/348,077, filed Apr. 29, 2008 (10 pages).
United States Patent and Trademark Office, "Interview Summary," issued in connection with U.S. Appl. No. 10/348,077, filed May 11, 2007 (2 pages).
United States Patent and Trademark Office, "Notice of Allowance," issued in connection with U.S. Appl. No. 10/348,592, filed Oct. 14, 2008 (4 pages).
United States Patent and Trademark Office, "Final Office Action," issued in connection with U.S. Appl. No. 10/348,592, filed Mar. 21, 2008 (11 pages).
United States Patent and Trademark Office, "Non-Final Office Action," issued in connection with U.S. Appl. No. 10/348,592, filed Jun. 14, 2007 (10 pages).
United States Patent and Trademark Office, "Non-Final Office Action," issued in connection with U.S. Appl. No. 10/348,592, filed Sep. 8, 2006 (7 pages).
United States Patent and Trademark Office, "Interview Summary," issued in connection with U.S. Appl. No. 10/829,795, filed Aug. 1, 2008 (2 pages).
United States Patent and Trademark Office, "Interview Summary," issued in connection with U.S. Appl. No. 10/829,539, filed Apr. 28, 2008 (2 pages).
United States Patent and Trademark Office, "Interview Summary," issued in connection with U.S. Appl. No. 10/829,509, filed Sep. 20, 2006 (4 pages).

United States Patent and Trademark Office, "Final Office Action," issued in connection with U.S. Appl. No. 10/744,555, on Jul. 17, 2009 (27 pages).

United States Patent and Trademark Office, "Notice of Allowance," issued in connection with U.S. Appl. No. 10/745,116, on Aug. 14, 2009 (7 pages).

United States Patent and Trademark Office, "Notice of Allowance," issued in connection with U.S. Appl. No. 10/745,168, on Aug. 7, 2009 (7 pages).

United States Patent and Trademark Office, "Non-Final Office Action," issued in connection with U.S. Appl. No. 10/745,170, on Oct. 14, 2009 (23 pages).

United States Patent and Trademark Office, "Non-Final Office Action," issued in connection with U.S. Appl. No. 10/829,495, on Oct. 1, 2009 (28 pages).

United States Patent and Trademark Office, "Non-Final Office Action," issued in connection with U.S. Appl. No. 10/829,539, on Aug. 25, 2009 (41 pages).

United States Patent and Trademark Office, "Notice of Allowance," issued in connection with U.S. Appl. No. 10/745,117, on Aug. 27, 2009 (7 pages).

* cited by examiner

| CUSTOMER ID | LOGICAL CIRCUIT ID | LOGICAL CIRCUIT STATUS | REROUTE STATUS |
|---|---|---|---|
| COMPANY A1 | 100 | FAILED | YES |
| COMPANY A2 | 800 | FAILED | NO |
| COMPANY B | 200 | WORKING | N/A |

FIG. 5

METHOD AND SYSTEM FOR REAL TIME SIMULTANEOUS MONITORING OF LOGICAL CIRCUITS IN A DATA NETWORK

CROSS-REFERENCE TO RELATED APPLICATIONS

This patent is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This patent is also related to and filed concurrently with U.S. patent application Ser. No. 10/745,117, entitled "Method And System For Providing A Failover Circuit For Rerouting Logical Circuit Data In A Data Network," filed on Dec. 23, 2003, U.S. patent application Ser. No. 10/744,281, entitled "Method And System For Utilizing A Logical Failover Circuit For Rerouting Data Between Data Networks," filed on Dec. 23, 2003, U.S. patent application Ser. No. 10/745,047, entitled "Method And System For Automatically Renaming Logical Circuit Identifiers For Rerouted Logical Circuits In A Data Network," filed on Dec. 23, 2003, U.S. patent application Ser. No. 10/745,170, entitled "Method And System For Automatically Identifying A Logical Circuit Failure In A Data Network," filed on Dec. 23, 2003, U.S. patent application Ser. No. 10/744,921, entitled "Method And System For Automatically Rerouting Logical Circuit Data In A Data Network," filed on Dec. 23, 2003, U.S. patent application Ser. No. 10/745,168, entitled "Method And System For Automatically Rerouting Logical Circuit Data In A Virtual Private Network," filed on Dec. 23, 2003, U.S. patent application Ser. No. 10/745,116, entitled "Method And System For Automatically Rerouting Data From An Overbalanced Logical Circuit In A Data Network," filed on Dec. 23, 2003, U.S. patent application Ser. No. 10/744,555, entitled "Method And System For Prioritized Rerouting Of Logical Circuit Data In A Data Network," filed on Dec. 23, 2003. All of the above-referenced applications are assigned to the same assignee as this patent and are expressly incorporated herein by reference.

TECHNICAL FIELD

The present invention relates to the routing of data using logical circuits in a data network. More particularly, the present invention is related to real time simultaneous monitoring of logical circuits in a data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host location is delivered to the network through a physical circuit which is a physical connection (such as a T1 line) that links to a switch of the network. The remote device that communicates with the host through the network also has a physical connection to a switch of the network. The communication path between the switches associated with the host and the remote device that passes through the network is a logical circuit. A single physical circuit may support multiple logical circuits in a data network.

In frame relay and ATM networks, end devices do not select different routes for data packets or cells sent between the host and the remote location, but always send the data packets or cells through the same path. A host device may have many logical circuits, such as permanent virtual circuits ("PVCs") or switched virtual circuits ("SVCs"), linked to many remote locations. For example, a PVC sends and receives data packets or cells through the same path leading to the switch of the remote device's physical connection.

In large-scale networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs").

Periodically, failures may occur to the trunk circuits or the NNIs of network circuits in large-scale networks causing lost data. Currently, such network circuit failures are handled by dispatching technicians on each end of the network circuit (i.e., in each LATA) in response to a reported failure. The technicians manually access a logical element module to troubleshoot the logical circuit portion of the network circuit. The logical element module communicates with the switches in the data network and provides the technician with the status of the logical connections which make up the logical circuit. Once the technician determines the status of a logical connection at one end of a logical circuit (e.g., the host end), the technician then must access a network database to determine the location of the other end of the logical circuit so that its status may also be ascertained. If the technician determines the logical circuit is operating properly, the technician then accesses a physical element module to troubleshoot the physical circuit portion of the network circuit to determine the cause of the failure and then repair it.

Current methods of determining network circuit failures, however, suffer from several drawbacks. One drawback is that logical circuits must be identified one at a time using the logical element module to isolate failures. In the event of a physical circuit failure, several logical circuits may need to be identified. The individual identification of logical circuits is time intensive and results in dropped data packets or cells until the each of the logical circuits is isolated and repaired. Furthermore troubleshooting the physical circuit often requires taking the network circuit out of service to perform testing, thus increasing the downtime and loss of data in the network circuit.

It is with respect to these considerations and others that the present invention has been made.

SUMMARY OF THE INVENTION

In accordance with the present invention, the above and other problems are solved by methods for real time simultaneous monitoring of logical circuits in a data network. According to one method, trap data is received for a group of logical circuits in the data network. The trap data may include current status information for each of the circuits in the logical circuit group. Next, based on the trap data, a logical identifier associated with each of the logical circuits in the group is identified. Then, each of the logical identifiers is associated with customer data stored in a database. The customer data includes one or more logical identifiers associated with a customer identification. Finally, the current status information for one or more logical circuits is displayed along with the corresponding customer identification.

The method may further include updating the customer data with the current status information. Each logical circuit may include one or more logical connections for communicating data in the data network. The trap data for the logical circuit group may include trap data for one or more logical connections. The logical identifiers may be data link connection identifiers ("DLCIs") or virtual path/virtual circuit identifiers ("VPI/VCIs"). Each logical connection may include a network-to-network interface. The data network may be a frame relay network or an asynchronous transfer mode ("ATM") network. The logical circuit may be a permanent virtual circuit ("PVC") or a switched virtual circuit ("SVC").

In accordance with other aspects, the present invention relates to a system for real time simultaneous monitoring of logical circuits in a data network. The system includes a network device for collecting trap data for a group of logical circuits in the data network. The trap data includes current status information for each of the logical circuits in the group. The system also includes a logical element module in communication with the network device. The logical element module receives the trap data for the logical circuit group. The system further includes a network management module in communication with the logical element module. The network management module receives the trap data from the logical element module and identifies a logical identifier associated with each of the logical circuits in the group, based on the trap data. The network management module also associates each of the logical identifiers with customer data stored in a database. The customer data includes one or more logical identifiers associated with a customer identification. The network management module displays the current status information for one or more logical circuits along with the corresponding customer identification.

These and various other features as well as advantages, which characterize the present invention, will be apparent from a reading of the following detailed description and a review of the associated drawings.

DETAILED DESCRIPTION OF THE INVENTION

Embodiments of the present invention provide for a method and system for real-time simultaneous monitoring of logical circuits in a data network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
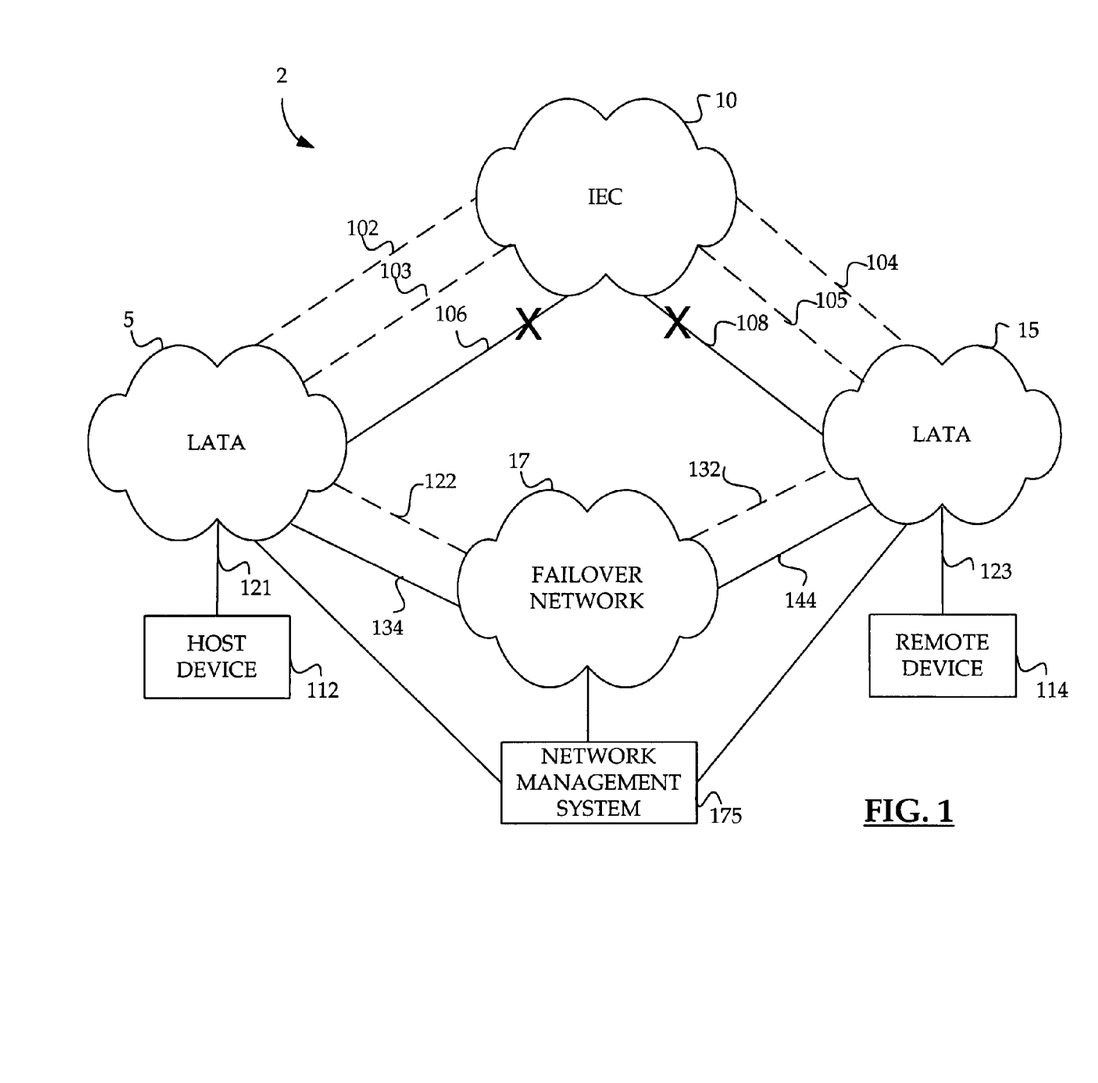
FIG. 1 illustrates a data network according to an embodiment of the invention.

Embodiments of the present invention may be generally employed in a data network 2 as shown in FIG. 1. The data network 2 includes local access and transport areas ("LATAs") 5 and 15 which are connected by an Inter-Exchange Carrier ("IEC") 10. It should be understood that the LATAs 5 and 15 may be operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes a network circuit which channels data between a host device 112 and a remote device 114 through the LATA 5, the IEC 10, and the LATA 15. It will be appreciated by those skilled in the art that the host and remote devices 112 and 114 may be local area network ("LAN") routers, LAN bridges, hosts, front end processors, Frame Relay Access Devices ("FRADs"), or any other device with a frame relay, ATM, or network interface. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5 and 15 and the IEC 10 may further include one or more interconnected network elements, such as switches (not shown), for transmitting data.

The network circuit between the host device 112 and the remote device 114 in the data network 2 includes a physical circuit and two logical circuits. As used in the foregoing description and the appended claims, a physical circuit is defined as the physical path that connects the end point of a network circuit to a network device. For example, the physical circuit of the network circuit between the host device 112 and the remote device 114 includes the physical connection 121 between the host device 112 and the LATA 5, the physical connection 106 between the LATA 5 and the IEC 10, the physical connection 108 between the IEC 10 and the LATA 15, and the physical connection 123 between the LATA 15 and the remote device 114. Routers and switches within the LATAs 5 and 15 and the IEC 10 carry the physical signal between the host and remote end devices 112 and 114 through the physical circuit.

It should be understood that the host and remote devices may be connected to the physical circuit described above using user-to-network interfaces ("UNIs"). As is known to those skilled in the art, an UNI is the physical demarcation point between a user device (e.g, a host device) and a public data network. It will further be understood by those skilled in the art that the physical connections 106 and 108 may include trunk circuits for carrying the data between the LATAs 5 and 15 and the IEC 10. It will be further understood by those skilled in the art that the connections 121 and 123 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices in a LATA or IEC network and over fixed communication data paths or logical connections between LATAs (or between IECs). Thus, no matter what path the data takes within each LATA or IEC, the beginning and end of each logical connection between networks will not change. For example, logical circuits of the network circuit in the data network 2 may include variable communication paths within the LATA 5 and fixed communication paths (i.e., the logical connections 102 and 103) between the LATA 5 and the IEC 10. It will be understood by those skilled in the art that the logical connections 102, 103, 104, and 105 in the data network 2 may include network-to-network interfaces ("NNIs") between the last sending switch in a LATA and the first receiving switch in an IEC.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame and service parameters for handling network congestion. For example, in the data network 2 implemented as a frame relay network, the designation DLCI 100 may be used to identify a logical circuit between the host device 112 and the remote device 114. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify a logical circuit in the LATA 5 and LATA 15 but the designation DLCI 800 may identify the same logical circuit in the IEC 10.

Illustrative service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination and specific bits which may indicate, for example, the existence of congestion in the network and a threshold for discarding cells.

It should be understood that the logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated that the data communicated over the logical connections 102, 103, 104, and 105 may be physically carried by the physical connections 106 and 108 in the data network 2. It should be understood that the logical connections described above are only illustrative and that the data from several logical connections may be carried by the physical connection in a data network. For example, in a frame relay network, a single physical connection may support as many as 1023 logical circuits or PVCs.

The data network 2 may also include a failover network 17 for rerouting logical circuit data, according to an embodiment of the invention. The failover network 17 may include a network failover circuit including physical connections 134 and 144 and logical connections 122 and 132 for rerouting logical circuit data in the event of a failure in the network circuit between the host device 112 and the remote device 114. The data network 2 may also include a network management system 175 in communication with the LATA 5 and the LATA 15 which may be utilized to obtain status information for the logical and physical circuit between the host device 112 and the remote device 114. The network management system 175 may also be utilized for to rerouting logical data in the data network 2 between the host device 112 and the remote device 114. The network management module 176 will be discussed in greater detail in the description of FIG. 3 below.

Figure 2:
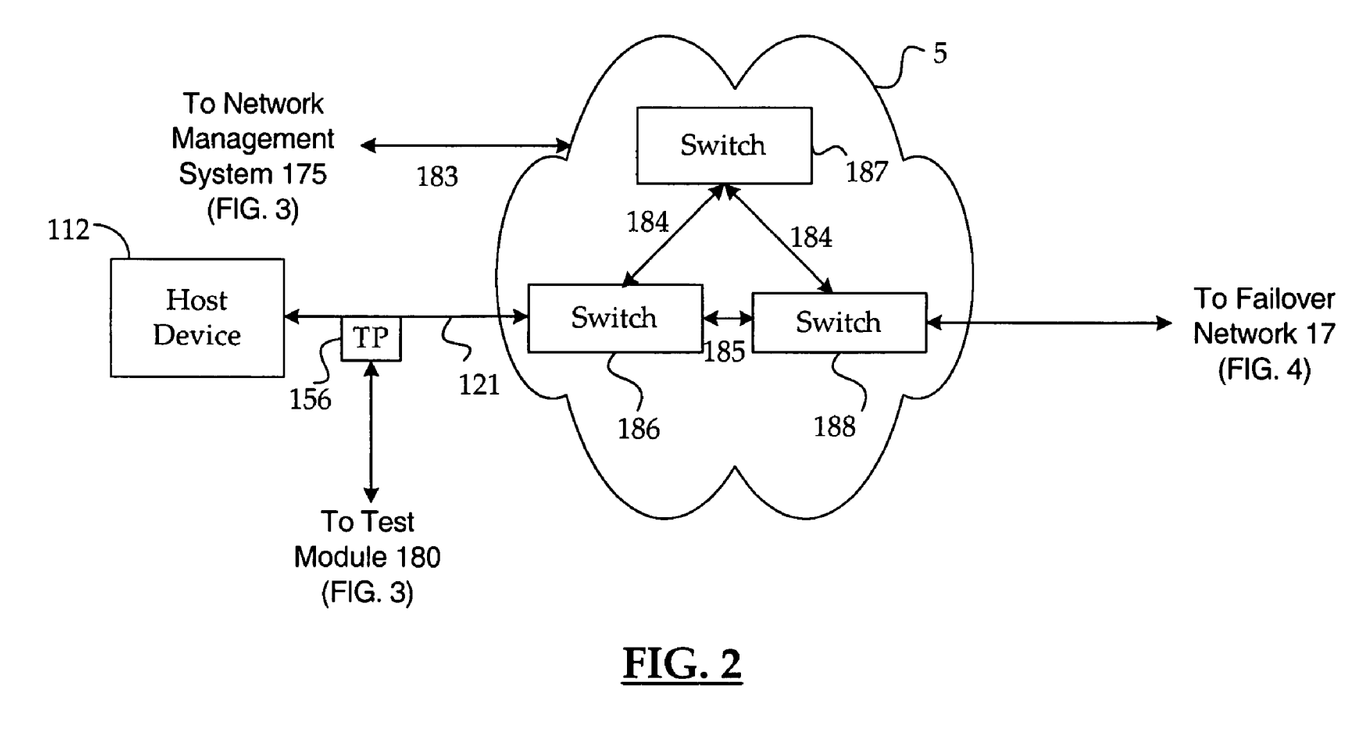
FIG. 2 illustrates a local access and transport area ("LATA") in the data network of FIG. 1, according to an embodiment of the invention.

FIG. 2 illustrates the LATA 5 in the data network 2 described in FIG. 1 above, according to an embodiment of the present invention. As shown in FIG. 2, the LATA 5 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail in the description of FIG. 3 below), in the network management system 175. The trap may include, for example, status information indicating whether or not one or more logical circuits are communicating data.

In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 112 and 114 receive status information from the switches in the individual LATAs they are connected to in response to a status request sent in a special management frame or cell. The LMI status information may include, for example, whether or not the logical circuit is congested or whether or not the logical circuit has failed. It should be understood that the parameters and the signaling mechanism discussed above are optional and that other parameters and mechanisms may also be utilized to obtain connection status information for a logical circuit.

Figure 3:
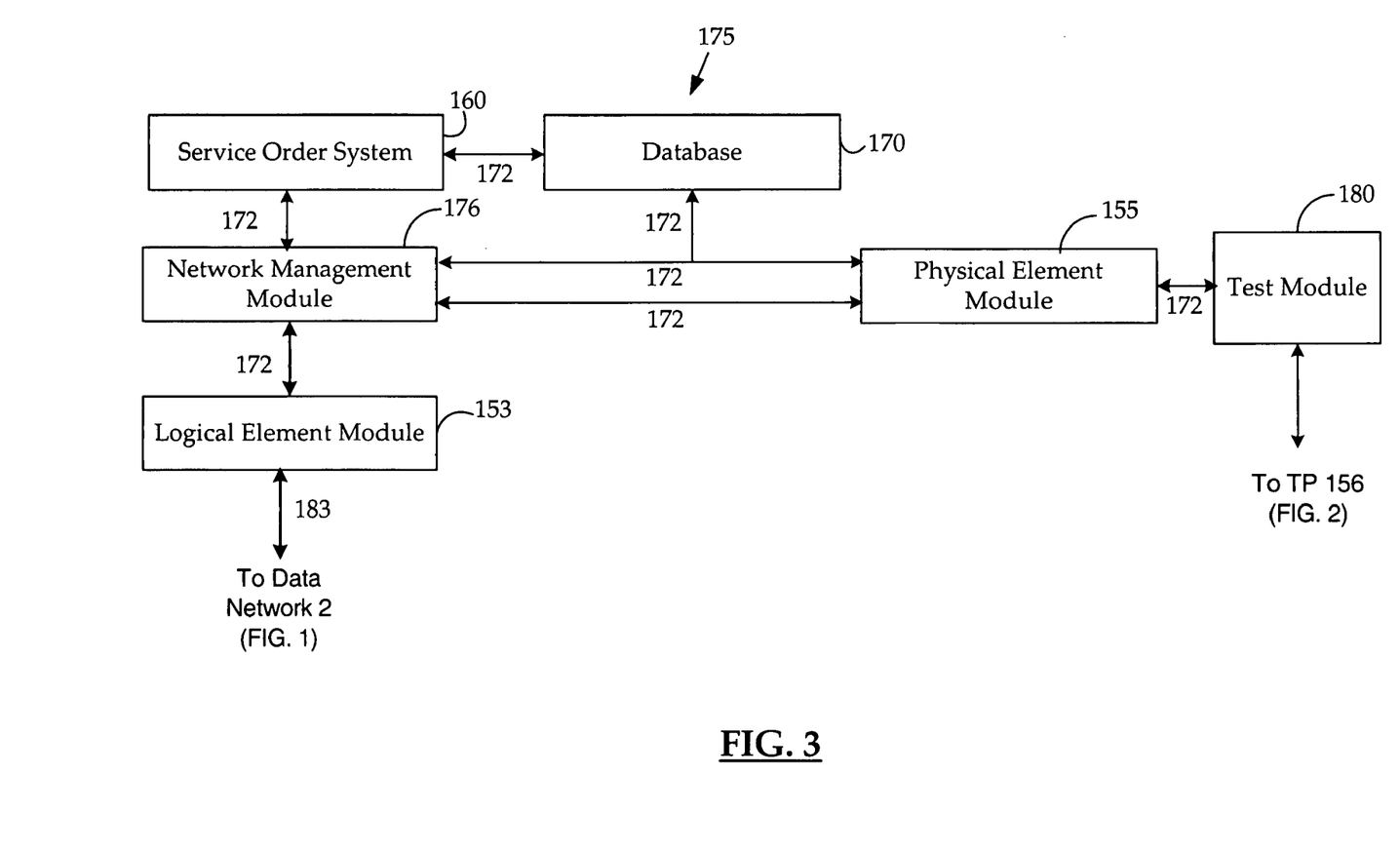
FIG. 3 illustrates a network management system which may be utilized for real time simultaneous monitoring of logical circuits in the data network of FIG. 1, according to an embodiment of the invention.

FIG. 3 illustrates the network management system 175 which may be utilized to monitor the status of multiple logical circuits in the data network of FIG. 1, according to an embodiment of the invention. The network management system 175 includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit portion of the network circuit such as a logical port number on the switch 186 for transmitting logical data over the physical connection 121 to and from the host device 112. As is known to those skilled in the art, a single logical port may support multiple logical circuits (i.e., PVCs or SVCs) over a single physical connection.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information regarding logical circuits such as the logical identifier data. The logical identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections via test access point 156. The test module 180 obtains the status of the physical circuit by transmitting "clean" test signals to test access point 156 (shown in FIG. 2) which "loops back" the signals for detection by the test module 180. It should be understood that there may be multiple test access points on each of the physical connections for the physical circuit.

The network management system 175 further includes the network management module 176 which is in communication with the service order system 160, the network database 170, the logical element module 153, and the physical element module 155 through communications channels 172. It should be understood that in one embodiment, the network management system 175 may also be in communication with the LATA 15, the IEC 10, and the failover network 17. The communications channels 172 may be on a LAN. The network management module 176 may consist of terminals (not shown), which may be part of a general-purpose computer system that displays a map-based GUI of the logical connections, and other status information for logical circuits, in data networks. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this patent, which is expressly incorporated herein by reference. An illustrative network management module is the Broadband Network Management System® ("BBNMS") marketed by TELECORDIA™ TECHNOLOGIES, Inc. of Morristown, N.J.

Figure 4:
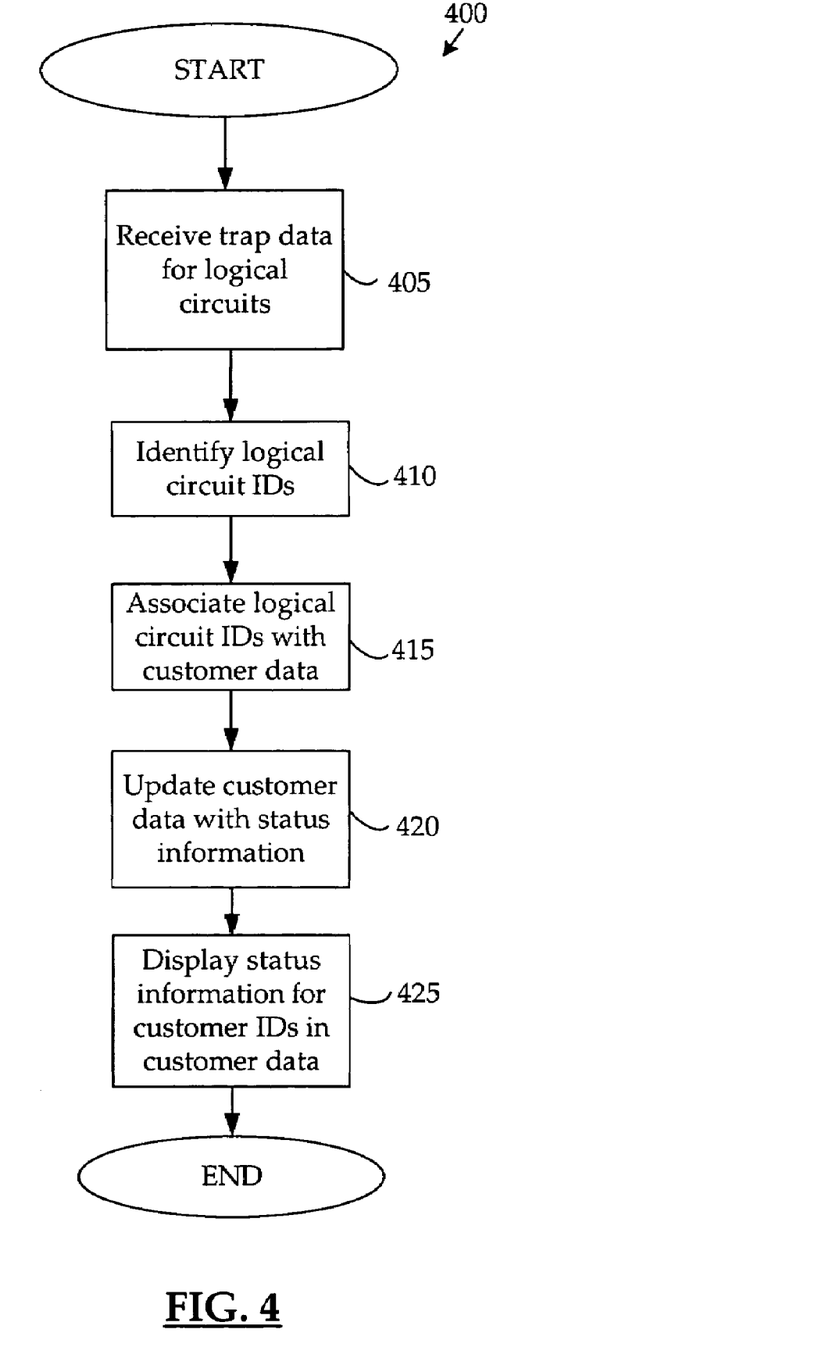
FIG. 4 illustrates a flowchart describing logical operations for real time simultaneous monitoring of logical circuits in the data network of FIG. 1, according to an embodiment of the invention.

FIG. 4 illustrates a flowchart describing logical operations 400 for real-time monitoring of multiple logical circuits in the data network 2 of FIG. 1, according to an embodiment of the invention. The logical operations 400 begin at operation 405 where the network management module 176 communicates with the logical element module 153 to receive trap data indicating the current status of the logical circuits in the data network 2. It should be understood that the trap data may include status information for one or more logical connections which make up each logical circuit. As discussed above in the description of FIG. 2, trap data is continuously generated by the switches in the data network 2, and then communicated to the logical element module 153 each time a change in status occurs.

For example, in one embodiment, the network management module 176 may be configured to receive status information for the NNI or logical connections 102 and 103 in the data network 2, by requesting the trap data generated by the switches 186, 187, and 188 in the LATA 5. It will be appreciated that in one embodiment, the network management module 176 may be configured to first request trap data for logical connections on one end of each logical circuit (e.g., the host end) and then identify the logical connections for the other end of each logical circuit (e.g., the remote end) based on the logical identifiers (i.e., the DLCI or VPI/VCI information) for the logical circuits. It will be appreciated that the network management module 176 may obtain the logical identifiers by polling the logical element module 153. Once the logical identifiers for the logical circuits have been obtained, the network management module 176 may then access the network database 170 to "lookup" the NNI or logical connections on the far end of each logical circuit and request the trap data for those logical connections.

After receiving the trap data for the logical circuits in the data network 2 at operation 405, the logical operations 400 continue at operation 410 where the network management module 176 identifies logical circuit identifiers (IDs) associated with each logical circuit. As discussed above, the network management module 176 may obtain the logical identifiers by polling the logical element module 153. The logical operations 400 then continue from operation 410 to operation 415.

Figure 5:
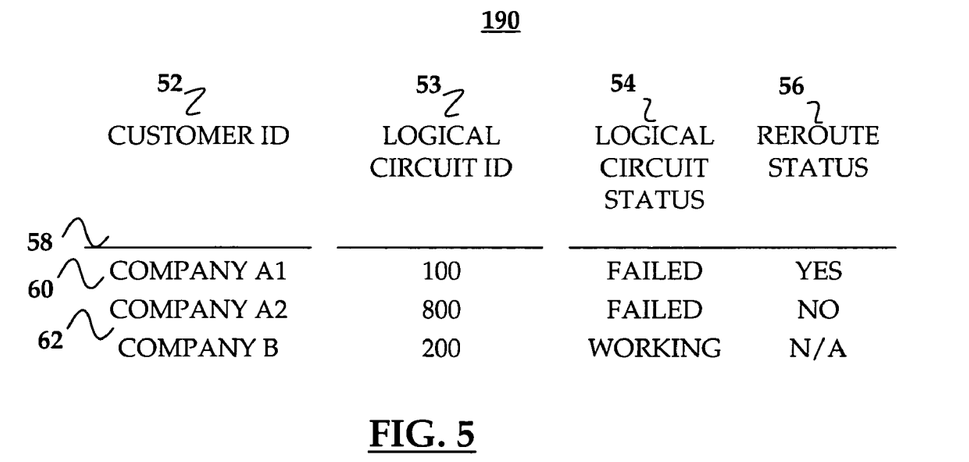
FIG. 5 illustrates a table of customer data indicating the status of logical circuits in the data network of FIG. 1, according to an embodiment of the invention.

At operation 415, the network management module 176 associates the logical circuit IDs for each logical circuit with customer data stored in a database, such as the network database 170. It will be appreciated in an alternative embodiment of the invention, the database may be contained within the network management module 176. The customer data may include a customer identification (ID) for a network subscriber which is associated with each logical circuit in the data network 2. The customer data may further include current status information for each logical circuit assigned to a specific customer. A table showing illustrative customer data is shown in FIG. 5, which will be discussed in greater detail below. The logical operations 400 then continue from operation 415 to operation 420.

At operation 420, the network management module 176 updates the customer data in the database (such as the network database 170) with the status information contained in the trap data received at operation 405. It will be appreciated that the status information may include whether one or more logical circuits in the data network 2 has failed. The logical operations then continue from operation 420 to operation 425.

At operation 425, the network management module 176 displays the status information for each customer ID in the customer data stored in the database. As discussed above, the network management module 176 may consist of terminals for displaying status information for logical circuits in data networks. For example, if the status information indicates that one or more logical circuits for a customer have failed, this information would be displayed to a technician at the network management module 176. It will be appreciated that upon determining failed logical circuits, the network management module may initiate a reroute procedure to reroute the data from the failed logical circuits to the failover network 17 (shown in FIG. 1). The failover network 17 may include logical failover circuits (not shown) for rerouting logical circuit data until the failure in the logical circuits is repaired. An illustrative method detailing the rerouting of logical circuit data to a logical failover circuit is presented in co-pending U.S. patent application Ser. No. 10/744,921, entitled "Method And System For Automatically Rerouting Logical Circuit Data In A Data Network," filed on Dec. 23, 2003, and assigned to the same assignee as this patent, which is expressly incorporated herein by reference. The logical operations 400 then end.

FIG. 5 illustrates a table 190 of customer data indicating the status of logical circuits in the data network 2, according to an embodiment of the invention. As shown in FIG. 5, the table includes a customer ID column 52, a logical circuit ID column 53, a logical circuit status column 54, and a reroute status column 56. The customer ID column 52 shows the customers assigned to logical circuits in the data network 2. For example, COMPANY A has two logical circuits in the data network 2 which are identified as COMPANY A1 AND COMPANY A2 while COMPANY B has one logical circuit (identified as COMPANY B). The logical circuit ID column 53 shows the logical circuit IDs for the logical circuits assigned to each customer in the data network 2. The logical circuit status column 54 shows the current status of the logical circuits in the data network 2 for each customer (i.e., whether the circuit is failed or working). It will be appreciated that the current status indicators in the column 54 may be color-coded to facilitate the identification of logical circuit failures. For example, the "FAILED" indicator for logical circuits may be shown in red while the "WORKING" indicator may be shown in green. Finally, the reroute status column 56 shows if the data for a logical circuit is being rerouted (such as to the failover network 17) in the data network 2.

For example, in row 58 of the table 190, customer ID COMPANY A1 is shown associated with a logical circuit ID 100 having a current status of "FAILED" and a reroute status of "YES" (indicating that the data from the circuit is currently being rerouted). Similarly, in row 59 of the table 190, customer ID COMPANY A2 is shown associated with a logical circuit ID 800 having a current status of "FAILED" and a reroute status of "NO" (indicating that the data from the circuit is currently not being rerouted). It will be appreciated that the logical circuit failures may be indicative of a failure in a physical connection carrying multiple logical circuits. For example, in the data network 2 shown in FIG. 1, the "X" marking the physical connections 106 and 108 indicate that both connections have failed. Consequently, any and all logical circuit data being carried by these physical connections would be lost. It will be appreciated that the customer data in the table 190 may be continuously updated in real time based on the trap data received from the logical element module 153 in the data network 2.

It will be appreciated that the embodiments of the invention described above provide for a method and system for real time simultaneous monitoring of logical circuits in a data network automatically identifying a failure in a logical circuit in a data network. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for real time simultaneous monitoring of a plurality of logical circuits in a data network, wherein each logical circuit comprises at least one logical connection for communicating data, the method comprising:

receiving trap data for a plurality of logical circuits in the data network, the trap data including current status information for each of the plurality of logical circuits, wherein a first one of the plurality of logical circuits connects a host device to a remote device and traverses a first local access and transport area, an inter-exchange carrier, and a second local access and transport area, wherein the inter-exchange carrier connects the first local access and transport area to the second local access and transport area, wherein the first local access and transport area is at a host end of the first one of the plurality of logical circuits associated with the host device, wherein the second local access and transport area is at a remote end of the first one of the plurality of logical circuits associated with the remote device, and wherein receiving the trap data for the plurality of logical circuits in the data network comprises:

requesting first trap data for a first logical connection at the host end of the first one of the plurality of logical circuits;

identifying, based on the first trap data, a logical identifier of the first one of the plurality of logical circuits;

accessing a database to identify a second logical connection at the remote end of the first one of the plurality of logical circuits based on the logical identifier of the first one of the plurality of logical circuits; and requesting second trap data for the second logical connection after identifying the second logical connection using the database;

updating customer data stored in the database with the current status information of the first one of the plurality of logical circuits based on the first and second trap data, the customer data comprising the logical identifier and a customer identification; and displaying the current status information for the first one of the plurality of logical circuits associated with the customer identification, wherein displaying the current status information comprises displaying whether the first one of the plurality of logical circuits has failed.

2. The method of claim 1, wherein when the first one of the plurality of logical circuits has failed, the first one of the plurality of logical circuits is no longer communicating data.

3. The method of claim 1, wherein requesting the first trap data for the first logical connection comprises requesting the first trap data from a switch that generated the first trap data in response to receiving a management communication via the data network indicating whether the first one of the plurality of logical circuits has failed or whether the first one of the plurality of logical circuits is congested.

4. The method of claim 1, wherein the logical identifier is a data link connection identifier (DLCI).

5. The method of claim 1, wherein the logical identifier is a virtual path/virtual circuit identifier (VPI/VCI).

6. The method of claim 1, wherein the first logical connection comprises a network-to-network interface.

7. The method of claim 1, wherein the first one of the plurality of logical circuits is a permanent virtual circuit.

8. The method of claim 1, wherein the first one of the plurality of logical circuits is a switched virtual circuit.

9. The method of claim 1, wherein the data network is a frame relay network.

10. The method of claim 1, wherein the data network is an asynchronous transfer mode (ATM) network.

11. The method of claim 1, wherein the first local access and transport area is operated by a first telecommunications carrier, and wherein the inter-exchange carrier is operated by a second telecommunications carrier.

12. A system for real time simultaneous monitoring of a plurality of logical circuits in a data network, where each logical circuit comprises at least one logical connection for communicating data, the system comprising:

a network device to collect trap data for the plurality of logical circuits in the data network, the trap data including current status information for each of the plurality of logical circuits, wherein a first one of the plurality of logical circuits connects a host device to a remote device and traverses a first local access and transport area, an inter-exchange carrier, and a second local access and transport area, wherein the inter-exchange carrier connects the first local access and transport area to the second local access and transport area, the first local access and transport area being at a host end of the first one of the plurality of logical circuits associated with the host device, the second local access and transport area being at a remote end of the first one of the plurality of logical circuits associated with the remote device;

a network management module, in communication with the network device, to:

request first trap data for a first logical connection at the host end of the first one of the plurality of logical circuits;

identify, based on the first trap data, a logical identifier of the first one of the plurality of logical circuits;

access a database to identify a second logical connection at the remote end of the first one of the plurality of logical circuits based on the logical identifier of the first one of the plurality of logical circuits; and request second trap data for the second logical connection after identifying the second logical connection using the database;

update customer data stored in the database with the current status information of the first one of the plurality of logical circuits based on the first and second trap data, the customer data comprising the logical identifier and a customer identification; and displaying the current status information for the first one of the plurality of logical circuits associated with the customer identification, wherein displaying the current status information comprises displaying whether the first one of the plurality of logical circuits has failed.

13. The system of claim 12, wherein when the first one of the plurality of logical circuits has failed, the first one of the plurality of logical circuits is no longer communicating data.

14. The system of claim 12, wherein the network device is to request the first trap data for the first logical connection by requesting the first trap data from a switch that generated the first trap data in response to receiving a management communication via the data network indicating whether the first one of the plurality of logical circuits has failed or whether the first one of the plurality of logical circuits is congested.

15. The system of claim 12, wherein the logical identifier is a data link connection identifier (DLCI).

16. The system of claim 12, wherein the logical identifier is a virtual path/virtual circuit identifier (VPI/VCI).

17. The system of claim 12, wherein the first logical connection comprises a network-to-network interface.

18. The system of claim 12, wherein the first one of the plurality of logical circuits is a permanent virtual circuit.

19. The system of claim 12, wherein the first one of the plurality of logical circuits is a switched virtual circuit.

20. The system of claim 12, wherein the data network is a frame relay network.

21. The system of claim 12, wherein the data network is an asynchronous transfer mode (ATM) network.

22. The system of claim 12, wherein the first local access and transport area is operated by a first telecommunications carrier, and wherein the inter-exchange carrier is operated by a second telecommunications carrier.

* * * * *

UNITED STATES PATENT AND TRADEMARK OFFICE
CERTIFICATE OF CORRECTION

PATENT NO. : 7,639,623 B2 Page 1 of 1
APPLICATION NO. : 10/744283
DATED : December 29, 2009
INVENTOR(S) : Taylor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twenty-first Day of December, 2010

David J. Kappos
*Director of the United States Patent and Trademark Office*